Dec. 15, 1970 D. C. FLETCHER ET AL 3,546,923
SEAL TEST STAND AND FIXTURE
Filed Feb. 5, 1969 3 Sheets-Sheet 1
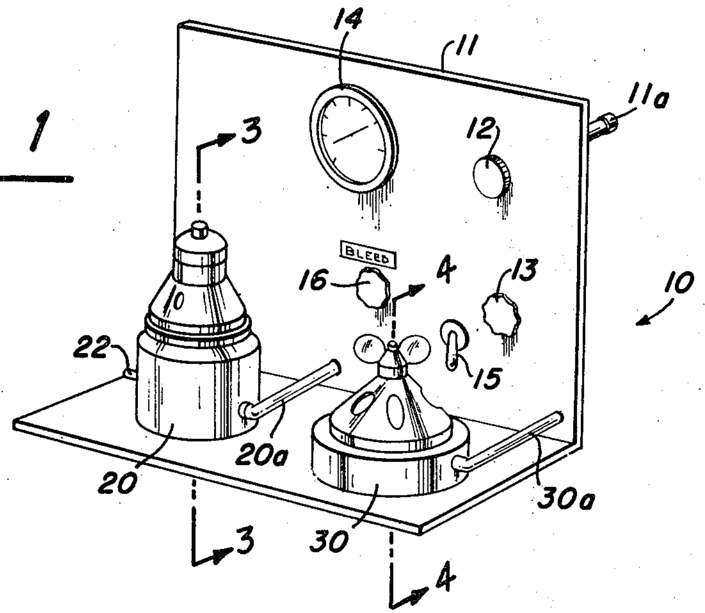
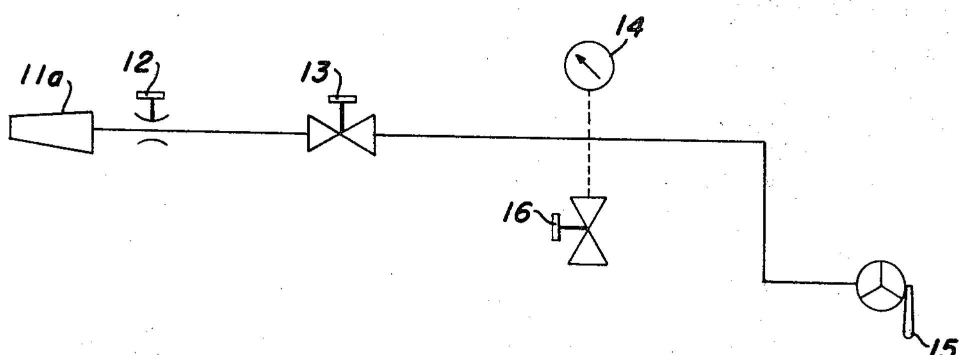
INVENTORS
DAVID C. FLETCHER
BY EDWARD S. NICHOLAS
THOMAS G. KEOUGH
ERVIN F. JOHNSTON
ATTORNEYS Dec. 15, 1970 D. C. FLETCHER ET AL 3,546,923

SEAL TEST STAND AND FIXTURE

Filed Feb. 5, 1969 3 Sheets-Sheet 2

INVENTORS
DAVID C. FLETCHER
BY EDWARD S. NICHOLAS

THOMAS G. KEOUGH
ERVIN F. JOHNSTON
ATTORNEYS

Dec. 15, 1970 D. C. FLETCHER ET AL 3,546,923

SEAL TEST STAND AND FIXTURE

Filed Feb. 5, 1969 3 Sheets-Sheet 3

INVENTORS
DAVID C. FLETCHER
EDWARD S. NICHOLAS
BY
THOMAS G. KEOUGH
ERVIN F. JOHNSTON
ATTORNEYS

United States Patent Office 3,546,923

Patented Dec. 15, 1970

3,546,923

SEAL TEST STAND AND FIXTURE

David C. Fletcher, San Diego, and Edward S. Nicholas, National City, Calif., assignors to the United States of America as represented by the Secretary of the Navy Filed Feb. 5, 1969, Ser. No. 796,669
Int. Cl. G01m 3/26
U.S. Cl. 73—40 5 Claims

ABSTRACT OF THE DISCLOSURE

A seal test stand connected to a source of pressurized air is provided with controlling valves passing predetermined amounts of compressed air regulated by an operator observing a gauge. The discrete amounts of air are passed to one or more seal test fixtures, each provided with an annular pressure chamber and an annular recess for receiving a seal to be tested and additionally having securing portions for holding the seal adjacent the pressure chamber. By transferring pressurized air to the pressure chamber and observing the pressure gauge, an obsever can tell if a seal is defective by noting whether or not pressure is maintained by the seal.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heavy duty compound seals mounted in motors, transmissions, or similar mechanisms are expensive. The time and labor involved in the installation of such seals are considerable due to the number of discrete mechanical steps involved in disassembly and reassembly. If, for example, while overhauling a helicopter transmission, the newly installed seals are found to be defective and the transmission leaks, the transmission must be stripped down and reassembled with new seals. Elimination of this time consuming practice is readily achieved by providing a device permitting an immediate "bench testing" of the seals. In addition, seals otherwise to be discarded after a set period of time according to routine maintenance procedures, can also be tested and retained upon being found intact. In the example helicopter transmission, internal seals valued at nearly $100.00 each are salvaged and the savings afforded by this testing technique are considerable.

SUMMARY OF THE INVENTION

The present invention is directed to providing an apparatus for indicating leaks in an annular seal and includes a source of pressurized air being selectively controlled and monitored by a valving network and an air gauge. At least one seal test fixture having a dish-shaped base element is formed with an annular pressure chamber shaped with an annular opening corresponding to the lateral dimensions of the seal to be tested. The seal is placed in an opposed relationship to the opening by a securing cone that forcibly holds the seal against the opening. A discrete amount of air is passed from the source of pressurized air to the pressure chamber and the interconnected air gauge is monitored by an operator who notes whether or not air pressure is maintained. If pressure is not maintained, the seal is considered defective and is discarded.

It is an object of the present invention to provide an apparatus for testing annular seals.

Another object is to provide a seal test fixture permitting a nondestructive testing of static and dynamic seals.

A further object is to provide a seal test fixture capable of subjecting a test seal to any of several different pressures for any given period of time.

A further object is to provide a simple, uncomplicated fixture operable after minimal instruction that permits the rapid testing of a number of sophisticated pressure seals.

Yet another object of the invention is to provide a fixture for testing several different sizes of seals.

These and other objects of the invention will become apparent from the ensuing detailed description when taken with the accompanying drawings.

BRIEF DESCRIPTION OF THE DRAWINGS

FIG. 1 is a isometric view of the invention.

FIG. 2 is a schematic representation of the invention's ducts and valving.

PREFERRED EMBODIMENT OF THE INVENTION

Figure 3A:
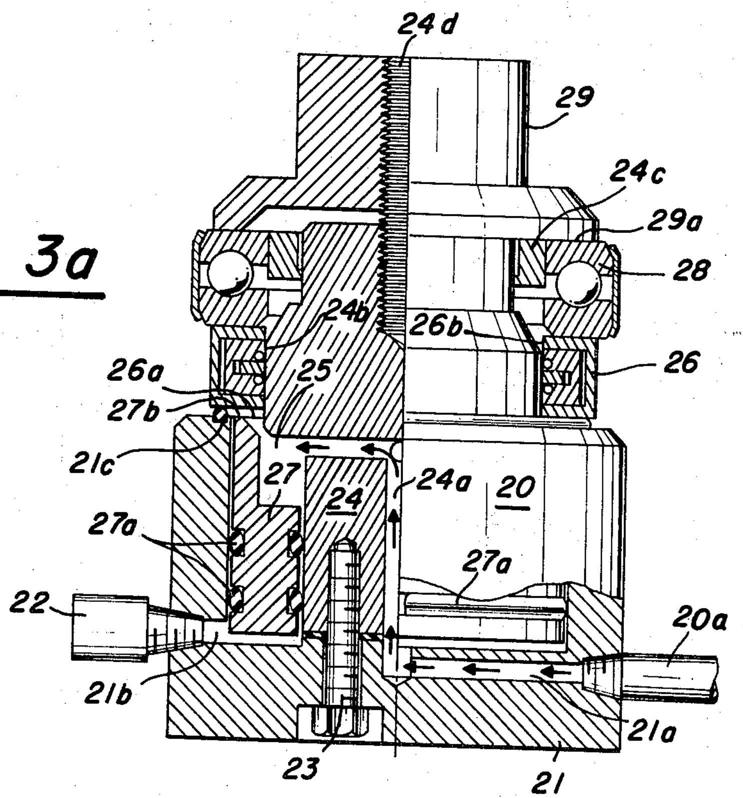
FIG. 3*a* is a sectional view taken along lines 3—3 in FIG. 1.

Referring now to the drawings, FIG. 1 depicts a complete seal test stand including, as principal components, a control 11 having an air inlet 11*a* connected to a distant source of pressurized air (not shown) and a first and a second test fixture 20 and 30.

A commercially available air regulator 12, represented in FIG. 1 by a knob 12 and schematically in FIG. 2 by the knob's being attached to a valve, is connected to the output of the air inlet and passes a given magnitude of pressurized air to a on-off valve 13 shown graphically in FIG. 1 as a knob 13 and schematically in FIG. 2 as the knob 13 attached to a valve. The on-off valve operates to permit free passage of the previously determined air pressure to pressurize the annular test chamber of either fixture or to complete block such passage. A monitoring pressure gauge 14 receives the transferred air and gives a visual indication of its precise magnitude. This regulated, gauged air is passed to a three-way valve 15 that selectively directs the air to either fixture 20 or 30 via one of a pair of conduits 20*a* or 30*a*. An interconnected bleed valve 16 is provided to permit selective depressurization of a particular seal test fixture in a manner and for the reasons disclosed below.

Screwed or welded on to the seal test stand, a first seal test fixture 20 is formed from a machined base element 21 provided with an inlet duct 21*a* connected to conduit 20*a* and further provided with a seal-release duct 21*b* having a release jet fitting 22 carried in its outer end.

At least one bolt 23 extends through the base element to secure a core element 24 to the base. The core element is shaped with a core duct 24*a* positioned to receive air transferred from inlet duct 21*a* for passing the air to a circumferentially disposed annular chamber 25. The core element is shaped with an outer extension 24*b* having an outer surface sized to correspond with a shaft upon which the seal to be tested 26 is normally operationally disposed. The seal is of a well-known type used to maintain a sealed relationship between separate compartments provided in rapidly rotating machinery and includes a metallic shell with a combination of metallic rings and rubber O-rings. An annular sleeve 27 is sized to fit between the core element and the base element to permit a longitudinal reciprocal motion upon the core element and several sleeve seals 27*a* are provided to ensure motion away from the base element when a seal release pressure is applied via the release jet fixture 22. When a seal testing pressure is transferred to the annular chamber 25 via the conduits 20*a* and core duct 24*a*, air leaks, giving an indication of the faulty seal being tested, are not erroneously provided by reason of sleeve seals 29*a*.

Figure 3B:
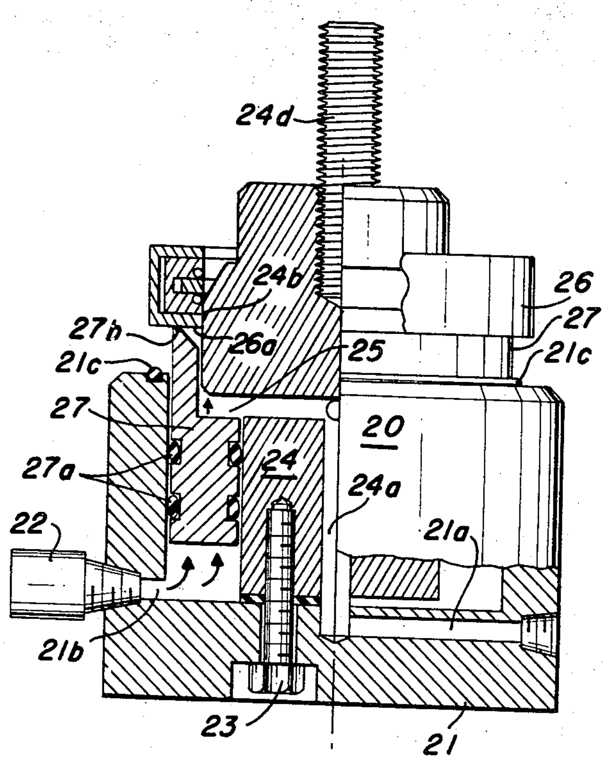
FIG. 3*b* is a sectional view generally taken along lines 3—3 in FIG. 1 showing the seal displaced on the fixture.
Figure 4A:
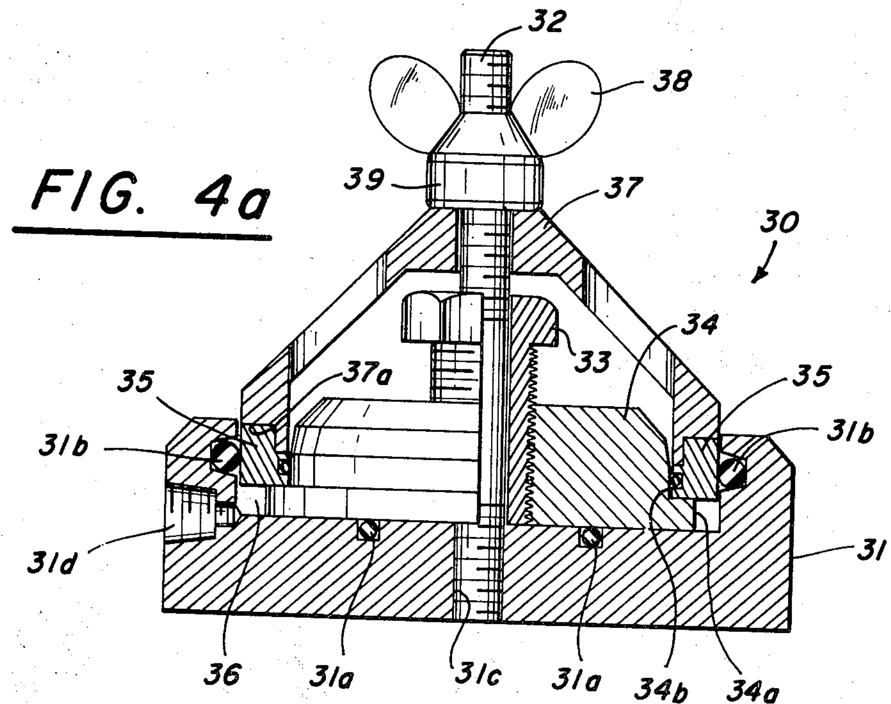
FIG. 4*a* is a sectional view taken along lines 4—4 in FIG. 1.
Figure 4B:
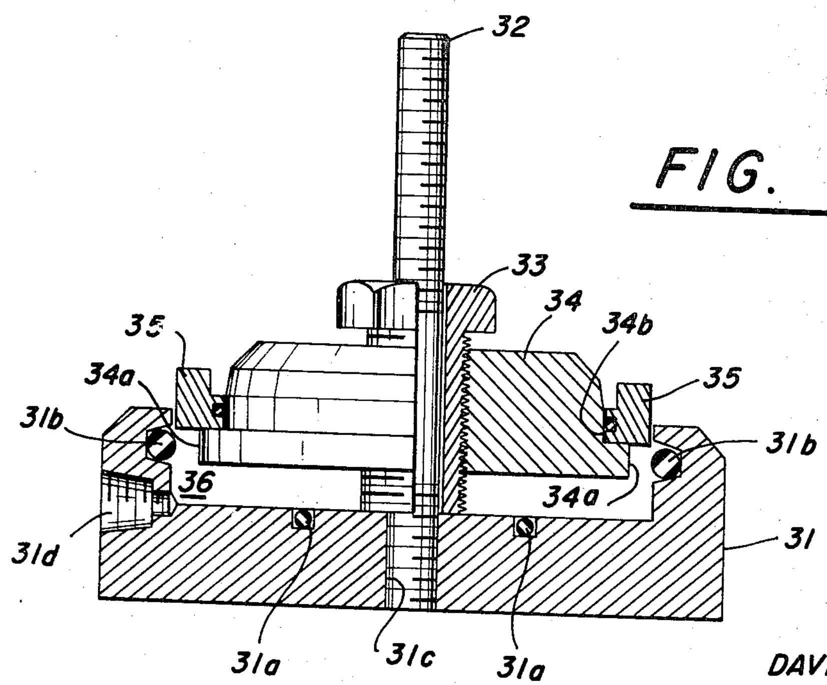
FIG. 4*b* is a sectional view generally taken along lines 4—4 in FIG. 1 showing the seal displaced on the fixture.

The core element is additionally formed with a ring-shaped spacer element 24*c* shaped to provide a support for a well-known, commercially available thrust bearing assembly 28. A coaxial threaded core post 24*d* provides a support for a correspondingly threaded cap element 29 having an internal rim 29*a* configured to abut one side of the thrust bearing assembly. The other side of the thrust bearing assembly is positionable to rest in a flush relationship against a seal to be tested 26. The outer surface of the cap element, being knurled to facilitate its mounting on core post 24*d*, is selectively tightened onto the post to force the seal against a base O-ring 21*c* thereby sealing shut the annular chamber 25. A volume of pressurized air is transferred to the test fixture 20 from the control panel and to an inner surface 26*a* of the bearing. If the bearing is defective, air will leak between the inner annular surfaces of the seal 26, to the outer side 26*b*, and to the surrounding air. Any air leakage or loss of pressure in the chamber 25 is visually detected by an operator monitoring the gauge 14 and the seal is discarded. After a seal has been tested and pressure has been bled off by releasing the air trapped in the annular chamber 25 via bleed valve 16, the cap element is unscrewed from the core post and the thrust bearing assembly is removed from the fixture by connecting a suitable source of pressurized air to the release jet fixture 22. This connection transfers pressurized air to the seal release duct 21*b* and the pressurized air longitudinally displaces the annular sleeve 27. Being so displaced causes the sleeve's outermost rim 27*b* to abut the seal's inner surface 26*a* and to force seal 26 out past the core outer-extension 24*b* and thusly enables an operator's removing the seal from the fixture. This manner of removal does not damage the seal since the extracting pressure is uniformly applied along the outermost rim of the annular sleeve; see FIG. 3*b*.

A second seal test fixture is depicted that is capable of testing a different type seal and uses similar mechanics of construction and manners of operation as the aforementioned discussed fixture. A machined base element 31 is screwed or welded onto a complete seal test 10. An annular recess provided in the base element houses a first base O-ring 31*a* and a second annular recess carries a second base O-ring 31*b*. A threaded bore 31*c* mounts a threaded stud 32 extending upward from the base. A release bolt 33 is coaxially carried on the stud and has its inner surface not threaded to prevent mechanical engagement with the stud to allow free rotation thereabout. The outer surface of the bolt is machined with threads configured to correspond to threads provided on the inner surface of a bore provided in a disc 34. The disc is formed with a radially extending rim 34*a* and an outer circumferential surface 34*b* that together coact to form a supporting surface for a seal to be tested 35. With the seal in place, an annular pressure chamber 36 is formed between the seal, the disc element, and the base. Pressure, transferred to this chamber from a conduit 30*a* passing pressurized air through an opening in the base element 31*b*, is applied directly to the seal for testing purposes. A cone-shaped element 37 having a circumferential rim portion 37*a* shaped to conform to an outer surface of a seal to be tested surface, forces the seal against radial-extending rim 34*a* and outer circumferential surface 34*b* when a wing nut 38 is screwed onto the stud to force a thrust bearing 39 against an outer portion of the cone-shaped element. When a seal to be tested has been secured in place, a constant pressure applied to the pressure chamber is monitored by monitoring meter gauge 14. If this valve of air pressure drops, the seal is considered defective and discarded. Removal of the seal from this second seal test fixture 30 is readily accomplished by first removing the wing nut, thrust bearing, and cone-shaped element. Next, turning the bolt element while holding the disc raises the disc element carrying the seal away from the base element. The simple mechanical advantage realized by this turning operation permits an effortless seal removal operation. Removing the seal and reversing the bolt's direction of rotation to replace the disc element against the base element readies the fixture for another seal testing operation.

The seal testing sequence involves placing a test seal in one of the two fixtures, setting the desired test pressure via the air regulator 12, turning the on-off valve to the on position so that the air may pass through the test stand, and directing the flow of pressurized air to either one of the seal test fixtures. The shut-off valve is then turned to the off position to isolate the pressurized air at a constant level determined by the air regulator 12 within the air circuit including the monitoring gauge and the test seal. If a seal leaks, the decrease in air pressure is noted on the monitoring gauge. After testing a seal, bleed valve 16 can be actuated to release the pressure from the previously isolated system.

The three-way valve may be turned to a second position to connect the other fixture via its conduit to control panel 11. The on-off valve is turned on and a volume of pressurized air as predetermined by regulator 12 is passed to the second seal test fixture. The on-off valve is turned to the off position and the seal to be tested is subjected to an isolated pressure being monitored on the monitoring gauge. After it has been observed whether or not the seal is leakproof, the bleed valve is again actuated to release the pressure in the fixture.

Removal of the immediately tested seals from either fixtures 20 or 30 quickly and easily according to the methods outlined above, readies the seal test stand for additional use to enable the rapid testing of seals with a minimum expenditure of time and effort. By selective adjustment of the air regulator 12, a seal can be presently tested to the limits expected on a future job requirement to allow the present anticipation of possible future failures.

Obviously many modifications and variations of the present invention are possible in light of the above teachings and it is therefore to be understood that within the scope of the disclosed inventive concept of the invention may be practiced otherwise than as specifically described.

What is claimed is:

1. An apparatus for indicating leaks in annular seals comprising:

a source of pressurized air;

means for selectively controlling the flow of said pressurized air;

means for monitoring the pressure magnitude of said pressurized air; and a first seal test fixture including,

- a first base element provided with a first annular pressure chamber connected to the controlling means being formed with a first annular opening,
- a core element secured to first base element having an annular outer surface sized to receive a seal to ensure a sealing relationship,
- securing means carried on said first base element having a first thrust bearing sized to contiguously abut an opposite side of the seal, and
- a cap element threadedly mounted on said core element having an internal rim disposed to circumferentially contact said first thrust bearing for securing a first side of a seal against said first annular opening in said sealing relationship by screwing said cap element onto said core element forcing said first side of the seal into said sealing relationship, upon transferring said pressurized air to said first annular pressure chamber, said means for monitoring indicating a decreasing pressure when a defective seal leaks.

2. An apparatus according to claim 1 in which said first seal test fixture further includes:

a release pressure chamber formed between said first base element and said core element;

a release jet fitting communicating with said release pressure chamber and adapted for connection with said source of pressurized air; and an annular sleeve disposed in said release pressure chamber to permit reciprocal motion therein and having an outer rim sized to pass through said first annular opening, upon removing said cap element and connecting said source of pressurized air to said release jet fitting, forcing said outer rim against the seal and forcing the seal off said annular outer surface of said core element.

3. An apparatus according to claim 1 further including:

a second seal test fixture including;

a dish-shaped base element, a threaded stud extending through said dish-shaped element, a disc element slidably carried on said stud and mechanically cooperating with said dish-shaped base element to form a second annular pressure chamber having an annular outlet, said disc element having an outer surface configured for supporting a seal to be tested contiguously along said annular outlet, an air fitting connecting said controlling means to said second annular pressure chamber, a cone-shaped element having an inner circumferential rim sized to abut the seal to be tested and being concentrically carried on said stud, a second thrust bearing concentrically carried on said stud and being in contact with said cone-shaped element, and a wing nut element engaging said stud for forcing a seal against said second annular pressure chamber, upon transferring said pressurized air to said second annular pressure chamber, said means for monitoring indicates leaking pressure and a defective seal.

4. An apparatus according to claim 3 further including:

means for depressurizing said second annular pressure chamber after a seal has been tested.

5. An apparatus according to claim 4 in which said second seal test fixture further includes:

a bolt element provided with a coaxial bore sized to dispose said bolt element on said stud in a freely rotatable manner and further provided with external threads mechanically engaging correspondingly shaped threads in the disc element, upon removing said wing nut element, said second thrust bearing, and said cone-shaped element, permitting removal of a seal from said annular outlet by turning said bolt element to displace said disc element from said dish-shaped base element.

References Cited

UNITED STATES PATENTS 3,097,521 7/1963 Dega ---------------- 73—40
3,188,855 6/1965 Dega ---------------- 73—37
3,400,572 9/1968 Mizenko ------------- 73—37

LOUIS R. PRINCE, Primary Examiner

W. A. HENRY II, Assistant Examiner